United States Patent
Akita et al.

(10) Patent No.: US 10,953,879 B2
(45) Date of Patent: Mar. 23, 2021

(54) VEHICLE CONTROL APPARATUS

(71) Applicant: DENSO CORPORATION, Kariya (JP)

(72) Inventors: Toshikazu Akita, Kariya (JP); Tomohisa Ose, Kariya (JP); Shigeru Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 16/094,673

(22) PCT Filed: Apr. 11, 2017

(86) PCT No.: PCT/JP2017/014806
§ 371 (c)(1),
(2) Date: Oct. 18, 2018

(87) PCT Pub. No.: WO2017/183519
PCT Pub. Date: Oct. 26, 2017

(65) Prior Publication Data
US 2019/0118820 A1    Apr. 25, 2019

(30) Foreign Application Priority Data
Apr. 18, 2016  (JP) .............................. JP2016-082728

(51) Int. Cl.
*B60W 30/18*        (2012.01)
*B60W 10/08*        (2006.01)
(Continued)

(52) U.S. Cl.
CPC ......... *B60W 30/18072* (2013.01); *B60K 6/36* (2013.01); *B60K 6/387* (2013.01);
(Continued)

(58) Field of Classification Search
CPC .. B60K 6/36; B60K 6/387; B60K 6/48; F16D 48/02; B60Y 2200/92; B60Y 2300/192;
(Continued)

(56) References Cited

U.S. PATENT DOCUMENTS

2016/0017939 A1    1/2016  Maeda

FOREIGN PATENT DOCUMENTS

| JP | 2003-278805 A | 10/2003 |
| JP | 2012-97843 A  | 5/2012  |

(Continued)

OTHER PUBLICATIONS

Jul. 18, 2017 International Search Report issued in International Application PCT/JP2017/014806.

*Primary Examiner* — Huan Le
(74) *Attorney, Agent, or Firm* — Oliff PLC

(57) ABSTRACT

A vehicle control apparatus is applied to a vehicle including an engine as traveling drive source and a clutch device in a power transmission path connected to an output shaft of the engine. The vehicle control apparatus causes the vehicle to be in a coasting state by reducing power transmitted in the path by clutch device operation upon satisfaction of a predetermined implementation condition, and cancels coasting state by clutch device operation upon satisfaction of a predetermined coasting cancellation condition including at least an accelerator condition during coasting. The vehicle control apparatus includes a travel determination section determining coasting state of the vehicle, and a clutch control section performing half-clutch control during coasting at least at one of at the beginning of coasting and immediately before coasting is cancelled, the half-clutch control setting a degree of clutch device engagement to an intermediate degree.

20 Claims, 11 Drawing Sheets

(51) Int. Cl.
 B60W 10/06 (2006.01)
 B60W 10/10 (2012.01)
 B60T 8/00 (2006.01)
 F16D 48/02 (2006.01)
 B60K 6/36 (2007.10)
 B60K 6/387 (2007.10)
 B60K 6/48 (2007.10)
 B60W 10/02 (2006.01)
 B60W 10/18 (2012.01)
 B60W 20/00 (2016.01)

(52) U.S. Cl.
 CPC ............... *B60K 6/48* (2013.01); *B60T 8/00* (2013.01); *B60W 10/02* (2013.01); *B60W 10/06* (2013.01); *B60W 10/08* (2013.01); *B60W 10/10* (2013.01); *B60W 10/18* (2013.01); *B60W 20/00* (2013.01); *F16D 48/02* (2013.01); *B60W 2510/0291* (2013.01); *B60W 2510/0638* (2013.01); *B60W 2540/10* (2013.01); *B60W 2540/12* (2013.01); *B60W 2710/021* (2013.01); *B60W 2710/08* (2013.01); *B60W 2710/18* (2013.01); *B60Y 2200/92* (2013.01); *B60Y 2300/192* (2013.01); *Y02T 10/62* (2013.01)

(58) Field of Classification Search
 CPC ........... B60W 30/18072; B60W 10/02; B60W 10/06; B60W 10/08; B60W 10/18; B60W 20/00; B60W 2510/0291; B60W 2510/0638; B60W 2540/10; B60W 2540/12; B60W 2710/021; B60W 2710/08; B60W 2710/18; B60W 30/18
 See application file for complete search history.

(56) References Cited

FOREIGN PATENT DOCUMENTS

| JP | 2012097843 A | * | 5/2012 |
| JP | 2014-125128 A | | 7/2014 |
| JP | 2014-136476 A | | 7/2014 |

* cited by examiner

FIG.9
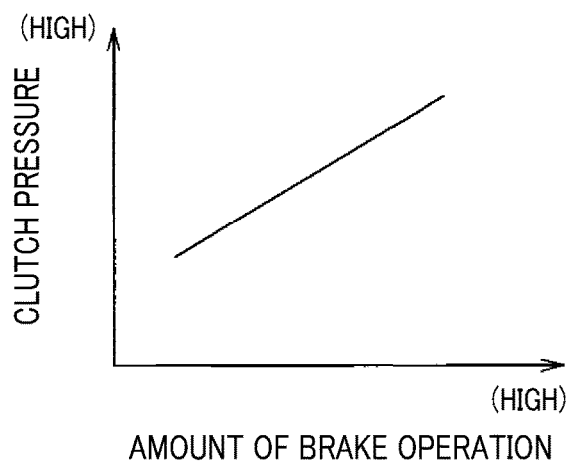
FIG.10
(a)
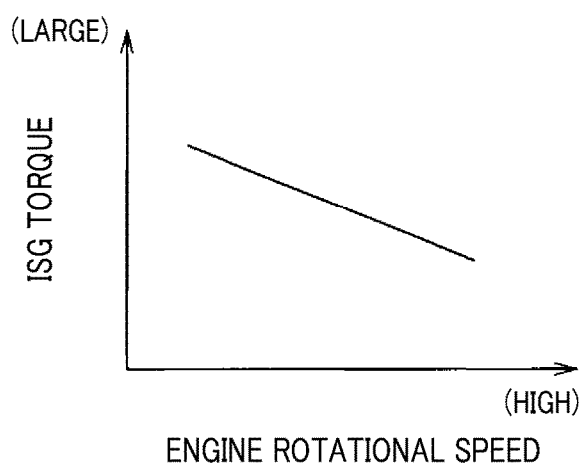
(b)
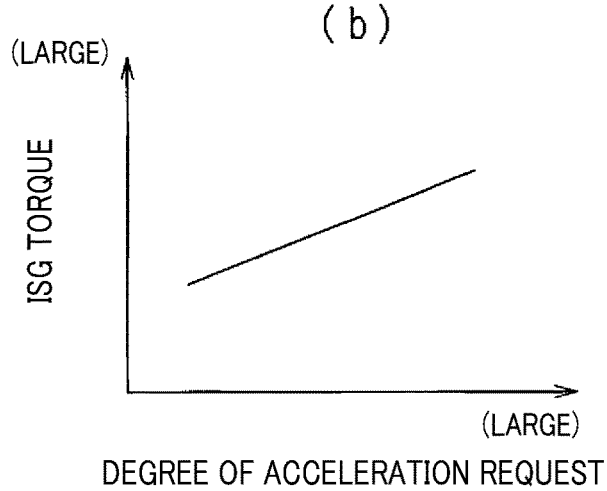

VEHICLE CONTROL APPARATUS

CROSS-REFERENCE TO RELATED APPLICATIONS

This application is the U.S. national phase of International Application No. PCT/JP2017/014806 filed Apr. 11, 2017 which designated the U.S. and claims priority to Japanese Patent Application No. 2016-82728 filed Apr. 18, 2016, the contents of which are incorporated herein by reference.

TECHNICAL FIELD

The present disclosure relates to a vehicle control apparatus.

BACKGROUND ART

In recent years, for improving fuel economy and the like, a technique has been applied to practical use in which, when an accelerator is turned OFF while a vehicle is traveling, the vehicle is caused to be in a coasting state by disengaging a clutch device provided between an engine and a transmission. For example, according to a technique described in Patent Literature 1, based on an amount of accelerator operation and an amount of brake operation performed by a driver, a requested acceleration/deceleration requested by the driver is calculated, and a first acceleration/deceleration of a vehicle in a non-coasting state and a second acceleration/deceleration of the vehicle in a coasting state are calculated. Then, switching between coasting and non-coasting is performed based on a comparison between the requested acceleration/deceleration and the first and second acceleration/deceleration. Furthermore, when the clutch device is disengaged, the acceleration/deceleration of the vehicle is reduced to the requested acceleration/deceleration by a friction brake of the vehicle.

CITATION LIST

Patent Literature

[Patent Literature 1] JP 2014-136476 A

SUMMARY OF THE INVENTION

When switching between coasting and non-coasting is performed, a power transmission path connected to the engine is intermittent by the clutch device, and thus deceleration of the vehicle may be discontinuous before and after the switching. In this regard, the technique of Patent Literature 1 attempts to adjust the deceleration by using the friction braking force in coasting state.

However, when the clutch device is switched to an engaged state or a disengaged state, an operation delay occurs in an actual transition to the engaged state or the disengaged state in response to a command to the clutch device. According to the technique of Patent Literature 1, therefore, a braking force may not be appropriately added by the friction brake, and this may impair continuity of the deceleration. For example, when the clutch device is activated according to hydraulic pressure, a delay may occur in change in the hydraulic pressure in response to a command, and this may damage continuity of the deceleration.

The present disclosure has been made in light of the above circumstances, and has a main object of providing a vehicle control apparatus which eliminates discontinuity of deceleration during switching between coasting and non-coasting and further achieves appropriate coasting control.

Hereinafter, a description of means for solving the above problem and effects thereof will be given.

A vehicle control apparatus of the present disclosure is applied to a vehicle including an engine as a traveling drive source and a clutch device provided in a power transmission path connected to an output shaft of the engine, the control apparatus causing the vehicle to be in a coasting state by reducing power transmitted in the power transmission path by operation of the clutch device upon satisfaction of a predetermined implementation condition, and cancels coasting state by operation of the clutch device upon satisfaction of a predetermined coasting cancellation condition including at least an accelerator condition during coasting. The vehicle control apparatus includes a travel determination section which determines that the vehicle is in coasting state, and a clutch control section which performs half-clutch control in coasting state at and immediately before coasting is cancelled, the half-clutch control setting an engagement degree of the clutch device to an intermediate degree state.

When coasting is started or cancelled, a braking force caused by the engine rotation (the so-called engine brake) is removed or added as a braking force of the vehicle. In this case, a deceleration of the vehicle may suddenly change before and after a state transition when coasting is started or cancelled, and this may deteriorate drivability. In this regard, according to the above configuration, in coasting state at least at one of the beginning of coasting and immediately before coasting is cancelled, the half-clutch control is performed in which the engagement degree of the clutch device is set to the intermediate degree state. This reduces or prevents a sudden change in the vehicle deceleration caused by an increase or a decrease in the braking force caused by the engine rotation. In particular, when the clutch device is set to be in the half-clutch state, a power transmission state is directly adjusted. This enables appropriate adjustment of the deceleration of the vehicle. Consequently, this eliminates discontinuity of the deceleration during switching between coasting and non-coasting, and further achieves appropriate coasting control.

BRIEF DESCRIPTION OF THE DRAWINGS

The above object and other objects, features, and advantages of the present disclosure will be clarified by the following detailed description with reference to the caused by drawings, wherein:

FIG. 9 shows a relationship between an amount of brake operation and a clutch pressure;

FIG. 10 (a) shows a relationship between an engine rotational speed and an ISG torque, and FIG. 10 (b) shows a relationship between a degree of acceleration request and an ISG torque;

DESCRIPTION OF THE EMBODIMENTS

A description will be given to embodiments of the present disclosure with reference to the drawings. According to the present embodiment, in a vehicle equipped with an engine as a traveling drive source, normal traveling in which the vehicle is traveling while a clutch is in a power transmission state and coasting (coasting travel) in which the vehicle is traveling while the clutch is in a power shutoff state are selectively performed.

First Embodiment

Figure 1:
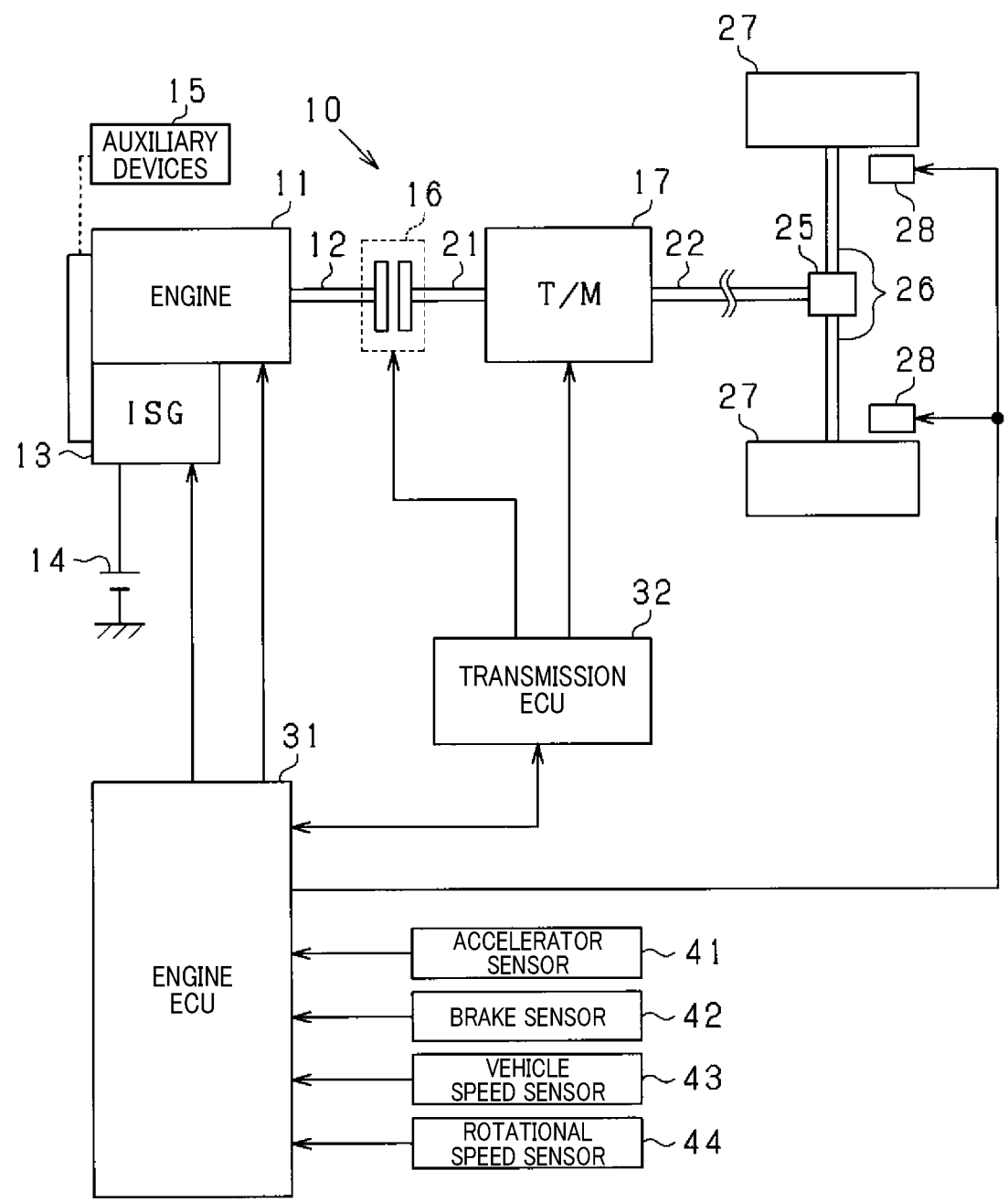
FIG. 1 is a block diagram illustrating an outline of a vehicle control system.

In a vehicle 10 illustrated in FIG. 1, an engine 11 is a multi-cylinder internal combustion engine which is driven by combustion of fuel such as gasoline, diesel oil, or the like. As well known, the engine 11 includes a fuel injector, an ignition device, and the like as appropriate. An ISG 13 (Integrated Starter Generator) as an electric motor is integrally mounted with the engine 11, and a rotating shaft of the ISG 13 is drive-coupled to an engine output shaft 12 with a belt or the like. In this case, the rotating shaft of the ISG 13 is rotated by rotation of the engine output shaft 12, while the engine output shaft 12 is rotated by rotation of the rotating shaft of the ISG 13. Specifically, the ISG 13 has a power generation function of generating electric power (regenerative power generation) by the rotation of the engine output shaft 12 and a power running function of providing a rotational force to the engine output shaft 12. When the engine 11 is started, the engine 11 performs an initial rotation (cranking rotation) by rotation of the ISG 13. When the vehicle 10 accelerates, the ISG 13 provides a driving force as appropriate.

A vehicle-mounted battery 14 is electrically connected to the ISG 13. In this case, the ISG 13 is driven by electric power supplied from the battery 14, and the battery 14 is charged with electric power generated by the ISG 13. The electric power of the battery 14 is used to drive various vehicle-mounted electrical loads.

In addition to the ISG 13, auxiliary devices 15, such as a water pump and a fuel pump, are mounted in the vehicle 10 as devices to be driven by the rotation of the engine output shaft 12. In addition, the vehicle 10 may include an air conditioner compressor as a device to be driven. Besides the devices drive-coupled to the engine 11 with the belt or the like, devices to be driven include a device directly coupled to the engine output shaft 12 and a device of which coupling to the engine output shaft 12 is made intermittent by a clutch means.

A transmission 17 is connected to the engine output shaft 12 via a clutch device 16 having a power transmission function. For example, the clutch device 16 is a hydraulically operated friction clutch. The clutch device 16 includes a pair of clutch mechanisms having a disc (flywheel or the like) connected to the engine output shaft 12 on an engine 11 side and a disc (clutch disc or the like) connected to a transmission input shaft 21 on a transmission 17 side. When the discs come into contact with each other in the clutch device 16, the clutch device 16 is in a power transmission state (clutch engaged state) in which power is transmitted between the engine 11 and the transmission 17. When the discs are separated from each other, the clutch device 16 is in a power shutoff state (clutch disengaged state) in which power transmission between the engine 11 and the transmission 17 is shut off. The clutch device 16 of the present embodiment is configured as an automatic clutch in which switching between the clutch engaged state and the clutch disengaged state is performed with a hydraulic pressure. The clutch device 16 may be mounted inside the transmission 17. The clutch device 16 may be configured to be switched between the engaged state and the disengaged state by a motor.

For example, the transmission 17 may be a continuously variable transmission (CVT) or a multistage transmission with a plurality of gears. The transmission 17 shifts power of the engine 11 inputted from the transmission input shaft 21 with a transmission gear ratio corresponding to a vehicle speed or an engine rotational speed, and outputs the power to a transmission output shaft 22.

Wheels 27 are connected to the transmission output shaft 22 via a differential gear 25 and a drive shaft 26 (vehicle drive shaft). A brake device 28 is mounted on each of the wheels 27. The brake device 28 provides a braking force to each of the wheels 27 by being driven by a hydraulic circuit (not shown) or the like. The brake device 28 adjusts the braking force provided to each of the wheels 27 according to a pressure in a master cylinder (not shown) which transmits a pedal force of a brake pedal to hydraulic fluid.

Furthermore, this system includes, as vehicle-mounted control means, an engine ECU 31 which controls an operation state of the engine 11 and a transmission ECU 32 which controls the clutch device 16 and the transmission 17. These ECUs 31 and 32 are each a well-known electronic control unit including a microcomputer and the like, and control as appropriate the engine 11, the transmission 17, and the like, for example, based on a result of detection performed by various sensors mounted in the system. The ECUs 31 and 32 are connected to each other so as to be able to communicate with each other and share a control signal, a data signal, and the like with each other. According to the present embodiment, the system includes the two ECUs 31 and 32, and the engine ECU 31 constitutes a "vehicle control apparatus". However, the configuration is not limited to this, and, for example, the vehicle control apparatus may be constituted by two or more ECUs.

As the sensors, the system includes an accelerator sensor 41 which detects an amount of stepping operation of an accelerator pedal as an accelerator operation member (an amount of accelerator operation), a brake sensor 42 which detects an amount of stepping operation of a brake pedal as a brake operation member (an amount of brake operation), a vehicle speed sensor 43 which detects a vehicle speed, a rotational speed sensor 44 which detects an engine rotational speed, and the like. A detection signal of each of these sensors is sequentially inputted into the engine ECU 31. In addition, the system includes an inclination angle sensor which detects an angle of inclination of a road surface on which the vehicle 10 is traveling, a voltage sensor which detects a battery voltage, a load sensor (air flow meter, intake pressure sensor) which detects an engine load, a coolant temperature sensor, an outside air temperature sensor, an atmospheric pressure sensor, and the like, though these sensors are not illustrated in FIG. 1.

Based on results of detections performed by various sensors and the like, the engine ECU 31 performs various types of engine control such as control of an amount of fuel injection performed by the fuel injector and control of ignition performed by the ignition device, control of engine start, engine torque assist, and power generation performed by the ISG 13, and control of braking performed by the brake device 28. Furthermore, based on the results of detection performed by various sensors and the like, the transmission ECU 32 performs control of intermittent performed by the clutch device 16 and control of transmission performed by the transmission 17.

The vehicle 10 of the present embodiment has a function of causing the vehicle 10 to coast by disengaging the clutch device 16 in a situation where the vehicle 10 is traveling by operation of the engine 11. Such coasting is performed to attempt to improve fuel economy. The engine ECU 31 has a control function regarding coasting and performs switching between a normal traveling state in which the vehicle 10 is traveling while the engine 11 is in an operating state and the clutch device 16 is in the engaged state (clutch-ON state) and a coasting state in which the vehicle 10 is coasting while the engine 11 is in a stop state and the clutch device 16 is in the disengaged state (clutch-OFF state).

Note that other than the configuration in which in coasting state, the engine 11 is in the stop state and the clutch device 16 is in the disengaged state, the engine ECU 31 may be configured such that in coasting state, the engine 11 is in the operating state (e.g., an idle state) and the clutch device 16 is in the disengaged state. In this case, in the clutch-OFF state, the engine 11 is preferably kept in the operating state in preparation for next reacceleration or the like, and when doing so, the engine 11 is preferably maintained in the idle state in order to save fuel.

During normal traveling of the vehicle 10, the engine ECU 31 causes the vehicle 10 to be in coasting state by disengaging (OFF state) the clutch device 16 upon satisfaction of predetermined implementation conditions including an accelerator condition and a brake condition. The implementation conditions preferably include an engine rotational speed being stable at a predetermined value or more (e.g., an idle rotational speed or more), a vehicle speed being within a predetermined range (e.g., the range of 20 to 120 km/h), a gradient (inclination) of the road surface being within a predetermined range, a drive amount of the electrical loads being a predetermined value or less, and the like. During coasting of the vehicle 10, the engine ECU 31 cancels coasting state by engaging (ON state) the clutch device 16 upon satisfaction of predetermined coasting cancellation conditions including an accelerator condition and a brake condition. In this case, coasting state is preferably cancelled when the implementation conditions for coasting become unsatisfied.

A detailed description will be given of a configuration regarding the conditions under which switching from coasting to normal traveling (non-coasting) occurs.

Figure 2:
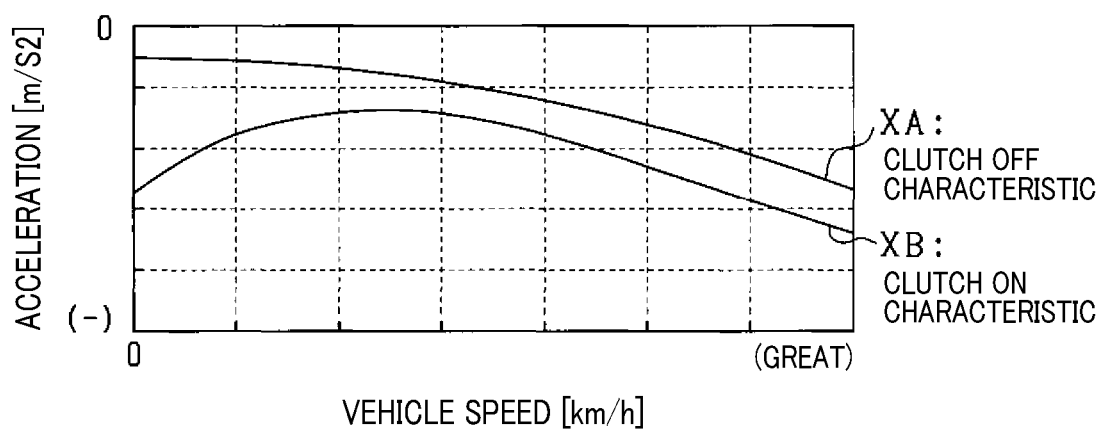
FIG. 2 is a diagram showing deceleration characteristics corresponding to a vehicle speed.

When the vehicle 10 is in coasting state while the accelerator is OFF and the clutch is OFF, a vehicle speed decreases relatively slowly. A deceleration [m/s2] in this case has a value corresponding to the vehicle speed, and, for example, the deceleration exhibits a deceleration characteristic shown as a clutch-OFF characteristic XA in FIG. 2. Such a state is a slow deceleration state in which no engine brake is applied and the vehicle decelerates mainly by vehicle running resistance. In FIG. 2, the deceleration [m/s2] is indicated as a negative acceleration [m/s2].

On the other hand, when the vehicle 10 is in the normal traveling state while the accelerator is OFF and the clutch is ON, the deceleration [m/s2] is greater than in coasting state, and, for example, the deceleration exhibits a deceleration characteristic shown as a clutch-ON characteristic XB in FIG. 2. That is, while the vehicle is traveling with the accelerator OFF, a driver feels the characteristic XA deceleration when the clutch is OFF, and the driver feels the characteristic XB deceleration when the clutch is ON.

The characteristics in FIG. 2 are determined assuming that a CVT is used as the transmission 17 and considering that a transmission gear ratio of the CVT is switched according to the vehicle speed. When a multistage transmission having a plurality of gears (shift positions) is used as the transmission, the clutch-OFF characteristic XA and the clutch-ON characteristic XB are preferably determined considering the gears of the multistage transmission. For example, it is preferable to determine a plurality of characteristics XA and XB for the respective gears.

In FIG. 2, a region above the characteristic XB is a deceleration region in which fuel injection is performed when the clutch is in the clutch-ON state. Specifically, the region above the characteristic XB is a region in which the deceleration is reduced by overcoming engine brake with a fuel combustion torque while the vehicle 10 is decelerating. A region below the characteristic XB is a deceleration region achieved by performing brake operation when the clutch is clutch-ON. When the clutch is clutch-ON, the deceleration indicated by the characteristic XA corresponds to the deceleration achieved by performing fuel injection, i.e., the deceleration in the region in which the deceleration is reduced by overcoming engine brake with the fuel combustion torque.

The following will examine a case where a transition is made from the clutch-OFF state to the clutch-ON state in order to cancel coasting. For example, in a case where brake operation is performed by the driver and a deceleration of the vehicle 10 is caused accordingly, and the deceleration increases to the characteristic XB deceleration, when a transition to the clutch-ON state is made, a deceleration appropriate to the clutch-ON state is caused, so that deceleration behavior of the vehicle 10 corresponding to a deceleration request from the driver is obtained. In this case, until the characteristic XB deceleration is obtained, it is preferable to allow the brake operation performed by the driver to cause the deceleration. Specifically, even when brake operation is performed by the driver, it is preferable to maintain coasting state until a transition is made to a state in which the characteristic XB deceleration is caused. Then, when the characteristic XB deceleration is obtained, the clutch is preferably in clutch-ON so that coasting is cancelled.

With regard to the vehicle deceleration state during non-coasting, in the region in which the deceleration is smaller than the characteristic XB deceleration, a desired deceleration (deceleration smaller than the characteristic XB deceleration) is obtained by performing fuel injection. During coasting, coasting is continued until the deceleration reaches the characteristic XB deceleration. In this case, in a region between the characteristic XA and the characteristic XB, a desired deceleration is obtained by the brake operation performed by the driver. Thus, fuel injection is not performed for achieving the deceleration in the region between the characteristic XA and the characteristic XB. This enables a reduction in fuel consumption.

According to the present embodiment, as coasting control performed by the engine ECU 31, in the vehicle deceleration state during coasting, a requested degree of deceleration, which is a degree of vehicle deceleration requested by brake operation performed by the driver, is calculated, and it is determined whether the requested degree of deceleration is greater than a threshold (a threshold based on the characteristic XB, corresponding to a first threshold) defined as a degree of vehicle deceleration while the accelerator is OFF and the clutch is ON. When the requested degree of deceleration is determined to be greater than the threshold, coasting is cancelled, and when the requested degree of deceleration is determined to be smaller than the threshold, coasting is maintained.

A detailed description will be given to a configuration regarding the conditions under which switching from normal traveling (non-coasting) to coasting occurs.

In a case where the amount of accelerator operation is reduced when the vehicle 10 is in the normal traveling state while the accelerator is ON and the clutch is ON, the vehicle 10 performs a transition from an acceleration state or a constant speed state to a deceleration state during the reduction (until the accelerator is turned OFF). Specifically, the range of the amount of accelerator operation includes the range of the amount of operation which provides acceleration or a constant speed and the range of the amount of operation which provides deceleration, according to the vehicle speed. When the amount of accelerator operation is reduced, the vehicle 10 transitions from the acceleration state or the constant speed state to the deceleration state when the amount of accelerator operation reaches a boundary threshold of these ranges.

The following will examine a case where a transition occurs from the clutch-ON state to the clutch-OFF state in order to cancel coasting. In a case where a deceleration of the vehicle 10 is caused by a reduction in the amount of accelerator operation, and the deceleration increases to the characteristic XA deceleration, when a transition to the clutch-OFF state is made, a deceleration appropriate to the clutch-OFF state is caused, so that deceleration behavior of the vehicle 10 corresponding to a deceleration request from the driver is obtained. In this case, even when the driver reduces the amount of accelerator operation, it is preferable not to start coasting until the characteristic XA deceleration is obtained and to start coasting when the characteristic XA deceleration is obtained.

With regard to fuel injection, when the deceleration has increased to the characteristic XA deceleration, in order to achieve the deceleration at this moment, the fuel injection is necessary in the clutch-ON state, but the fuel injection is unnecessary in the clutch-OFF state. Thus, starting coasting when the deceleration has increased to the characteristic XA deceleration eliminates the need to generate a combustion torque in the engine 11. This enables a reduction in fuel consumption.

According to the present embodiment, as coasting control performed by the engine ECU 31, in the vehicle deceleration state during non-coasting, a requested degree of deceleration, which is a degree of vehicle deceleration requested by a reduction in the amount of accelerator operation performed by the driver, is calculated, and it is determined whether the requested degree of deceleration is greater than a threshold (a threshold based on the characteristic XA, corresponding to a second threshold) defined as a degree of vehicle deceleration while the accelerator is OFF and the clutch is OFF. When the requested degree of deceleration is determined to be greater than the threshold, coasting is started, and when the requested degree of deceleration is determined to be smaller than the threshold, the non-coasting is maintained.

According to the present embodiment, a requested deceleration [m/s2], which is a deceleration requested to the vehicle, is used as the "requested degree of deceleration", and a threshold for a deceleration [m/s2] is used as the "threshold". The deceleration used here is an absolute value of acceleration, and a great deceleration means a great degree of deceleration.

When coasting and non-coasting of the vehicle 10 is selectively performed, the clutch device 16 is basically switched between the engaged state (ON) and the disengaged state (OFF). In the vehicle deceleration state, a difference lies between the clutch-ON state and the clutch-OFF state in whether a braking force caused by the engine rotation (the so-called engine brake) is applied. In this case, when coasting is started or cancelled, engine braking is removed or added as the braking force of the vehicle 10. Thus, the deceleration of the vehicle 10 may suddenly change before and after a state transition when coasting is started or cancelled, and this may deteriorate drivability.

According to the present embodiment, therefore, at the beginning when coasting is started and immediately before coasting is cancelled, half-clutch control is performed in which an engagement degree of the clutch device 16 is set to an intermediate degree state (the so-called half-clutch state). This reduces or prevents a sudden change in the vehicle deceleration from occurring due to an increase or a decrease in deceleration caused by the engine brake, and further reduces or prevents deterioration in drivability. The engagement degree of the clutch device 16 is also referred to as a slip ratio or a degree of press-engaging when the discs are press-engaged together.

In particular, there may be a case where the driver is performing brake operation while the vehicle 10 is coasting, and when an acceleration request is made by operating the accelerator ON while the driver is performing the brake operation, a sudden course change, collision avoidance, or the like is assumed. In this case, acceleration performance equivalent to or better than that of normal accelerator operation is presumably required. Thus, in coasting state, the engagement degree of the clutch device 16 is controlled based on brake operation information about brake operation performed by the driver. This enables quick switching from brake operation to accelerator operation, and further eliminates slow acceleration in coasting state.

Figure 3:
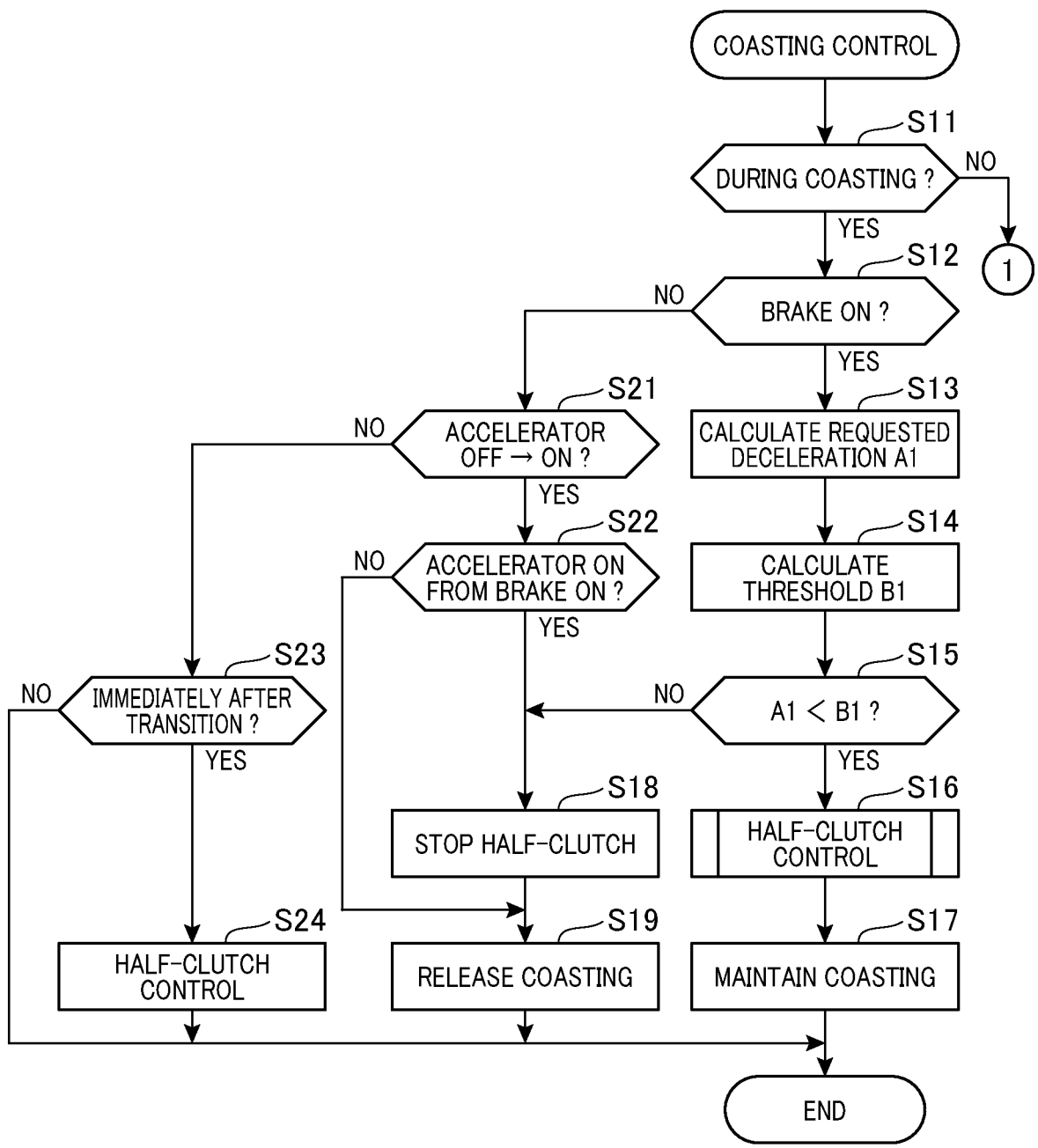
FIG. 3 is a flow chart showing a procedure for coasting control.
Figure 4:
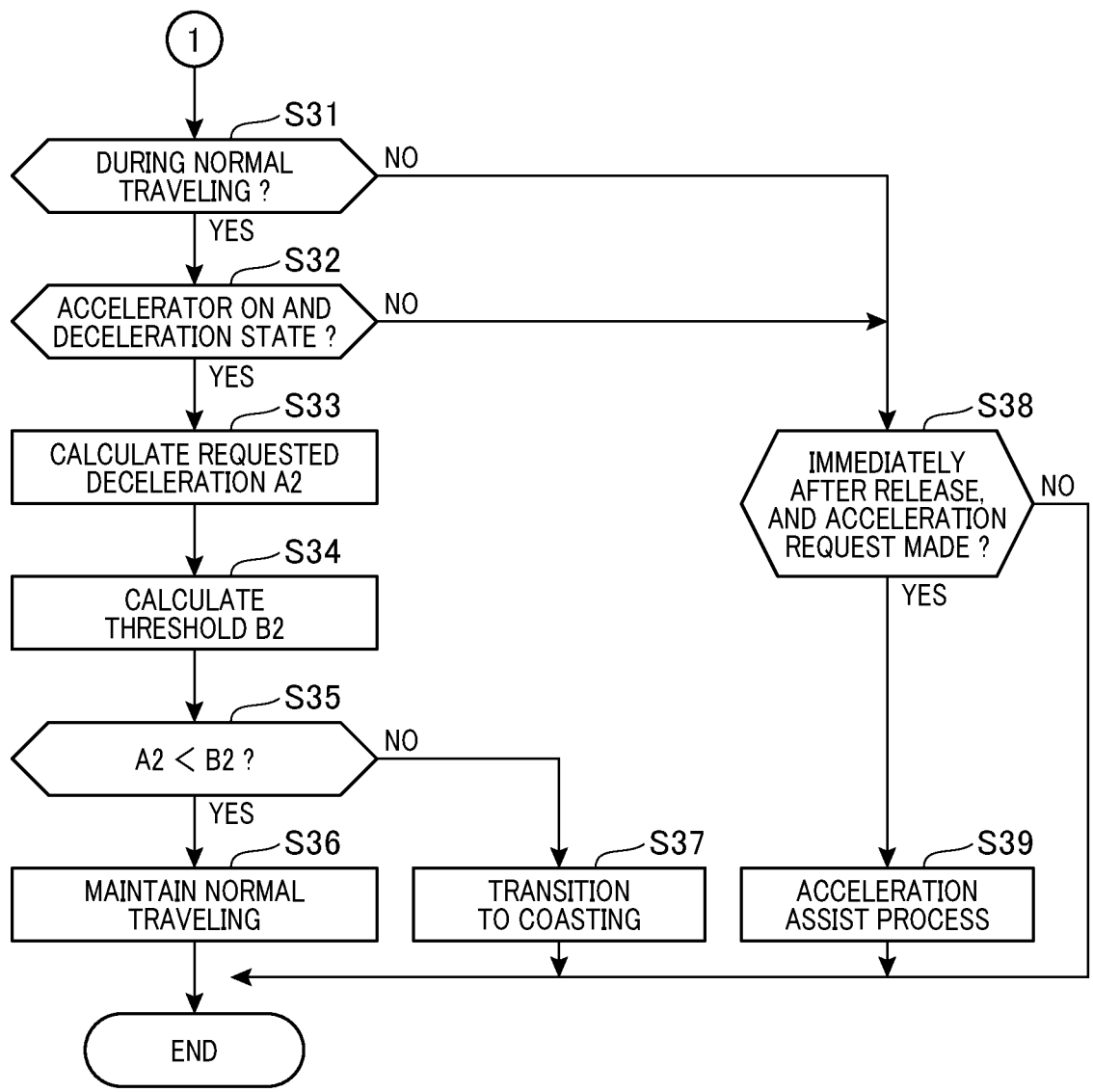
FIG. 4 is, following FIG. 3, a flow chart showing a procedure for coasting control.

FIGS. 3 and 4 are each a flow chart showing a procedure for coasting control, and the present process is repeatedly performed by the engine ECU 31 in a predetermined cycle.

In FIG. 3, at step S11, it is determined whether the vehicle 10 is currently in coasting state in which the clutch is clutch-OFF. When an affirmative determination (YES) is made at step S11, the process proceeds to step S12, and when a negative determination (NO) is made at step S11, the process proceeds to step S31 in FIG. 4. At step S11, when the clutch device 16 is in the half-clutch state, it is determined that the vehicle 10 is in coasting state, and an affirmative determination is made at step S11.

At step S12, it is determined whether the brake is ON. When the amount of brake operation detected by the brake sensor 42 exceeds zero, it is determined that the brake is ON. When an affirmative determination (YES) is made at step S12, the process proceeds to step S13.

Figure 5:
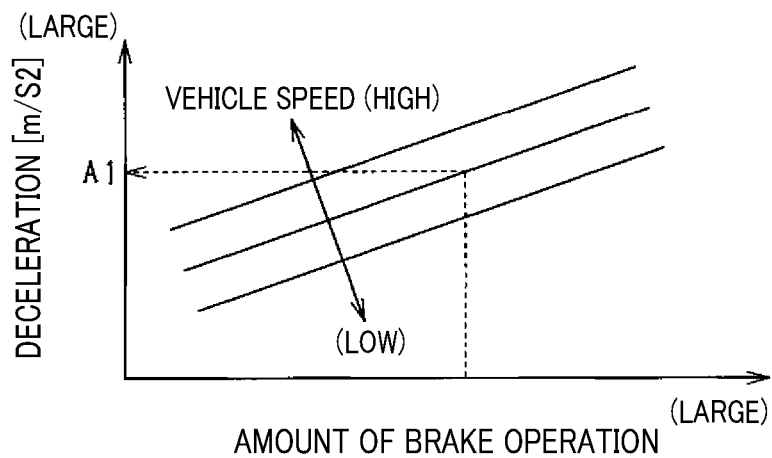
FIG. 5 shows a relationship between an amount of brake operation, a vehicle speed, and a deceleration.

At step S13, a requested deceleration A1 [m/s2] of the vehicle requested by brake operation performed by the driver is calculated. Specifically, the requested deceleration A1 is calculated by using a relationship shown in FIG. 5. FIG. 5 defines a relationship between the amount of brake operation, the vehicle speed, and the deceleration. The requested deceleration A1 is calculated based on the amount of brake operation (stepped amount of brake pedal) detected by the brake sensor 42 and the vehicle speed. In this case, as the amount of brake operation is greater or as the vehicle speed is greater, a greater value is obtained as the requested deceleration A1.

Figure 6:
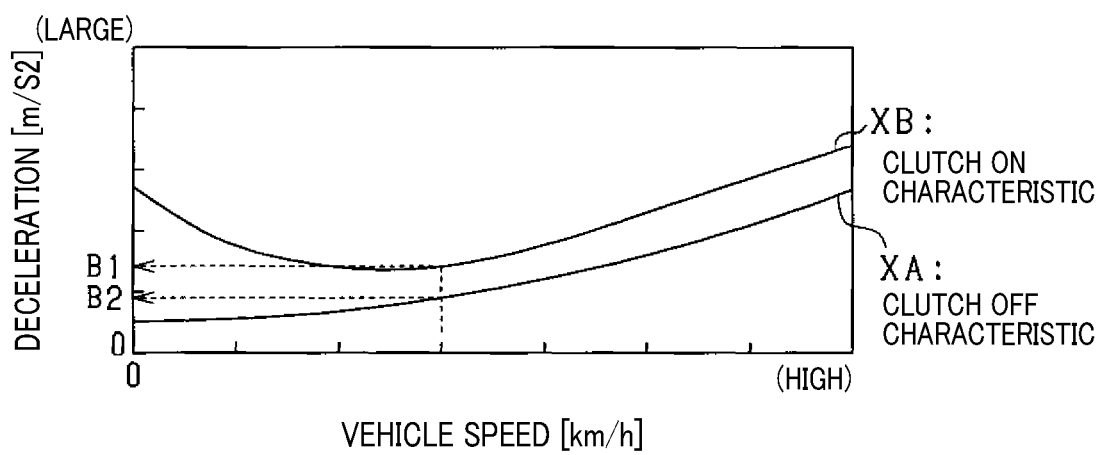
FIG. 6 shows a deceleration characteristic corresponding to a vehicle speed.

At subsequent step S14, a threshold B1 [m/s2] defined as the deceleration of the vehicle while the accelerator is OFF and the clutch is ON (non-coasting deceleration state) is calculated. Specifically, the threshold B1 is calculated by using correlation data shown in FIG. 6. FIG. 6 shows the characteristics XA and XB similar to those in FIG. 2, and for convenience, the longitudinal axis indicates the "deceleration". In this case, the clutch-ON characteristic XB in FIG. 6 corresponds to correlation data indicating correlation between the vehicle speed and the vehicle deceleration while the accelerator is OFF and the clutch is ON. The correlation data is used to calculate the threshold B1 based on the current vehicle speed. The threshold B1 is calculated as a greater value of deceleration than a threshold B2 (described later).

At step S15, it is determined whether the requested deceleration A1 is smaller than the threshold B1. When A1<B1, the process proceeds to step S16, and when A1≥B1, the process proceeds to step S18.

At step S16, half-clutch control is performed in which the engagement degree of the clutch device 16 is set to the intermediate degree state. At subsequent step S17, it is determined to maintain the clutch-OFF state, i.e., to maintain coasting state. In this case, the engine ECU 31 performs a process shown in FIG. 8 as the half-clutch control at step S16.

Figure 8:
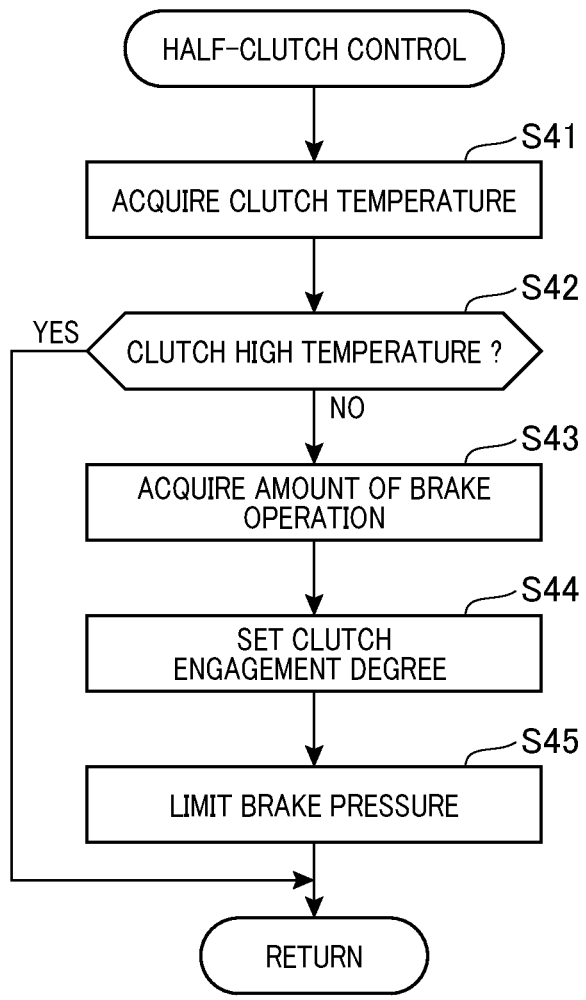
FIG. 8 is a flow chart showing a procedure for half-clutch control.

In FIG. 8, at step S41, a temperature of the clutch device 16 is acquired. In this case, the clutch temperature is preferably acquired as an estimated value or a detection value. For example, in the clutch device 16, the clutch temperature is estimated based on history information about the ON/OFF state and the half-clutch state, an outside air temperature, and the like. Alternatively, a temperature sensor is mounted in the clutch device 16, and the clutch temperature is detected by the temperature sensor.

At step S42, it is determined whether the clutch temperature is within a high temperature range higher than a predetermined temperature. When the clutch temperature is within the high temperature range, the present process ends without performing steps S43 to S45. In this case, setting of the degree of clutch engagement and the like are not performed, and thus the clutch device 16 is prohibited from being in the half-clutch state.

When the clutch temperature is not within the high temperature range, steps S43 to S45 are performed. Specifically, at step S43, the amount of brake operation performed by the driver is acquired, and at subsequent step S44, the engagement degree of the clutch device 16 is set based on the amount of brake operation. According to the present embodiment, the engagement degree of the clutch device 16 is controlled with a clutch pressure which is a hydraulic pressure for press-engaging the discs of the clutch device 16 together. For example, the clutch pressure is set by using a relationship shown in FIG. 9. FIG. 9 defines a relationship in which the clutch pressure increases as the amount of brake operation (i.e., the stepping amount of brake pedal) is greater. This means that the degree of clutch engagement increases as the amount of brake operation is greater.

Subsequently, at step S45, a process of limiting a brake pressure applied by the brake device 28 is performed, and then process returns to the process in FIG. 3. In this case, a process of reducing the brake pressure applied by the brake device 28, a process of setting the brake pressure applied by the brake device 28 to zero, or the like is performed. Specifically, while the vehicle is coasting and the brake is ON, a brake pressure is normally applied by the brake device 28 according to the amount of brake operation (a brake pedal force) performed by the driver. However, in consideration of engine brake occurring when the clutch device 16 is in the half-clutch state, the brake pressure is limited.

Returning to the process shown in FIG. 3, at step S18, a command to stop the half-clutch control is issued. At subsequent step S19, a transition to the clutch-ON state, i.e., cancellation of coasting state is determined.

When it is determined at step S12 that the brake is not ON, the process proceeds to step S21, and it is determined whether a transition has been made from the accelerator OFF state to the accelerator ON state immediately beforehand. The transition to the accelerator ON state means an occurrence of an acceleration request to the vehicle 10. When an affirmative determination (YES) is made at step S21, the process proceeds to step S22, and it is determined whether the accelerator ON this time is caused by switching from the brake ON state to the accelerator ON state. When the brake is ON immediately before the accelerator is ON, the half-clutch control at step S16 has been performed at that point. Thus, the process proceeds to step S18, and a command to stop the half-clutch control is issued. Then, at step S19, a transition to the clutch-ON state, i.e., cancel of coasting state is determined.

When a negative determination (NO) is made at step S21, i.e., when the vehicle is coasting and the brake is not ON or a transition to the accelerator ON state has not been made, the process proceeds to step S23. At step S23, it is determined whether a transition to coasting has been made immediately beforehand. When the transition to coasting has been made immediately beforehand, the process proceeds to step S24, and half-clutch control is performed. This half-clutch control is a process different from the half-clutch control at step S16, and for example, is a process of gradually reducing the degree of clutch engagement from the beginning of coasting. In this case, from the beginning of coasting, the degree of clutch engagement is preferably gradually reduced from 100% (clutch-ON). In the half-clutch control, instead of gradually reducing the degree of clutch engagement, the degree of clutch engagement may be temporarily maintained at a predetermined intermediate degree (e.g., 50%).

At step S31 in FIG. 4, it is determined whether the vehicle 10 is currently in the normal traveling state in which the clutch is ON, and when an affirmative determination (YES) is made at step S31, the process proceeds to step S32. At step S32, it is determined whether the accelerator is ON and the vehicle is in the deceleration state. When the amount of accelerator operation detected by the accelerator sensor 41 exceeds zero, it is determined that the accelerator is ON. When a vehicle speed detected by the vehicle speed sensor 43 is being reduced, it is determined that the vehicle is in the deceleration state. When an acceleration request to the vehicle 10 has been made by stepping operation of the accelerator pedal, a negative determination is made at step S32. When an affirmative determination (YES) is made at step S32, the process proceeds to step S33.

Figure 7:
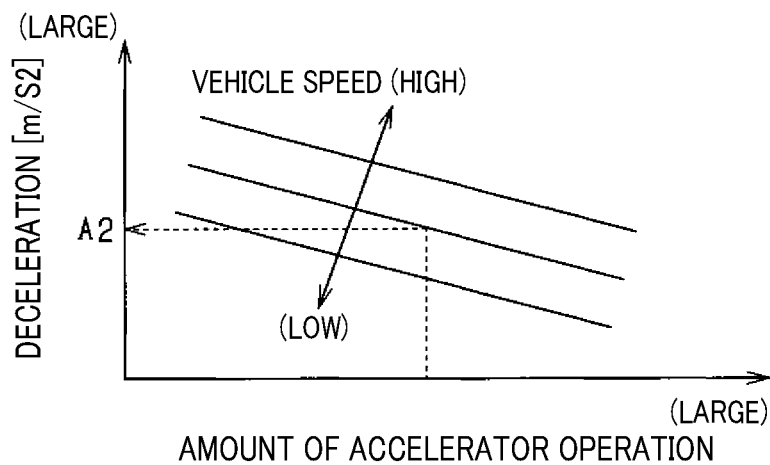
FIG. 7 shows a relationship between an amount of accelerator operation, a vehicle speed, and a deceleration.

At step S33, a requested deceleration A2 [m/s2] of the vehicle requested by a reduction in the amount of accelerator operation performed by the driver is calculated. Specifically, the requested deceleration A2 is calculated by using a relationship shown in FIG. 7. FIG. 7 defines a relationship between the amount of accelerator operation, the vehicle speed, and the deceleration. The requested deceleration A2 is calculated based on the amount of accelerator operation (stepping amount of accelerator pedal) detected by the accelerator sensor 41 and the vehicle speed. In this case, as the amount of accelerator operation is smaller or as the vehicle speed is greater, a greater value is obtained as the requested deceleration A2.

At subsequent step S34, the threshold B2 [m/s2] defined as the deceleration of the vehicle while the accelerator is OFF and the clutch is OFF (coasting deceleration state) is calculated. Specifically, the threshold B2 is calculated by using correlation data shown in FIG. 6. In this case, the clutch-OFF characteristic XA in FIG. 6 corresponds to correlation data indicating correlation between the vehicle speed and the vehicle deceleration while the accelerator is OFF and the clutch is OFF. The correlation data is used to calculate the threshold B2 based on the current vehicle speed.

At step S35, it is determined whether the requested deceleration A2 is smaller than the threshold B2. When A2<B2, the process proceeds to step S36, and when A2≥B2, the process proceeds to step S37. At step S36, it is determined to maintain the clutch-ON state, i.e., to maintain the normal traveling state. At step S37, it is determined to make a transition to the clutch-OFF state, i.e., a transition to coasting state. Furthermore, it is determined to stop the operation of the engine 11 together with the transition to coasting state. Alternatively, the engine 11 may be shifted to an idle operation state.

When a negative determination (NO) is made at step S32, the process proceeds to step S38, and it is determined whether coasting has been cancelled immediately beforehand and an acceleration request has been made. For example, when the accelerator pedal is pressed down continuously during coasting, an affirmative determination is made at step S38. When an affirmative determination (YES) is made at step S38, the process proceeds to step S39, and an acceleration assist process is performed by the ISG 13, and then the present process ends.

In the acceleration assist process, an amount of torque assist provided by the ISG 13 (ISG torque) is calculated based on at least one of the engine rotational speed and the degree of acceleration request when the accelerator is ON, and the ISG 13 is driven by power running based on the ISG torque. For example, the ISG torque is preferably calculated by using relationships shown in FIGS. 10 (a) and (b). FIG. 10 (a) shows a relationship in which the ISG torque is increased as the engine rotational speed is smaller. FIG. 10 (b) shows a relationship in which the ISG torque is increased as the degree of acceleration request is greater. The degree of acceleration request is preferably determined according to the amount of accelerator operation (pressing amount of accelerator pedal). The degree of acceleration request is greater as the amount of accelerator operation is greater.

Figure 11:
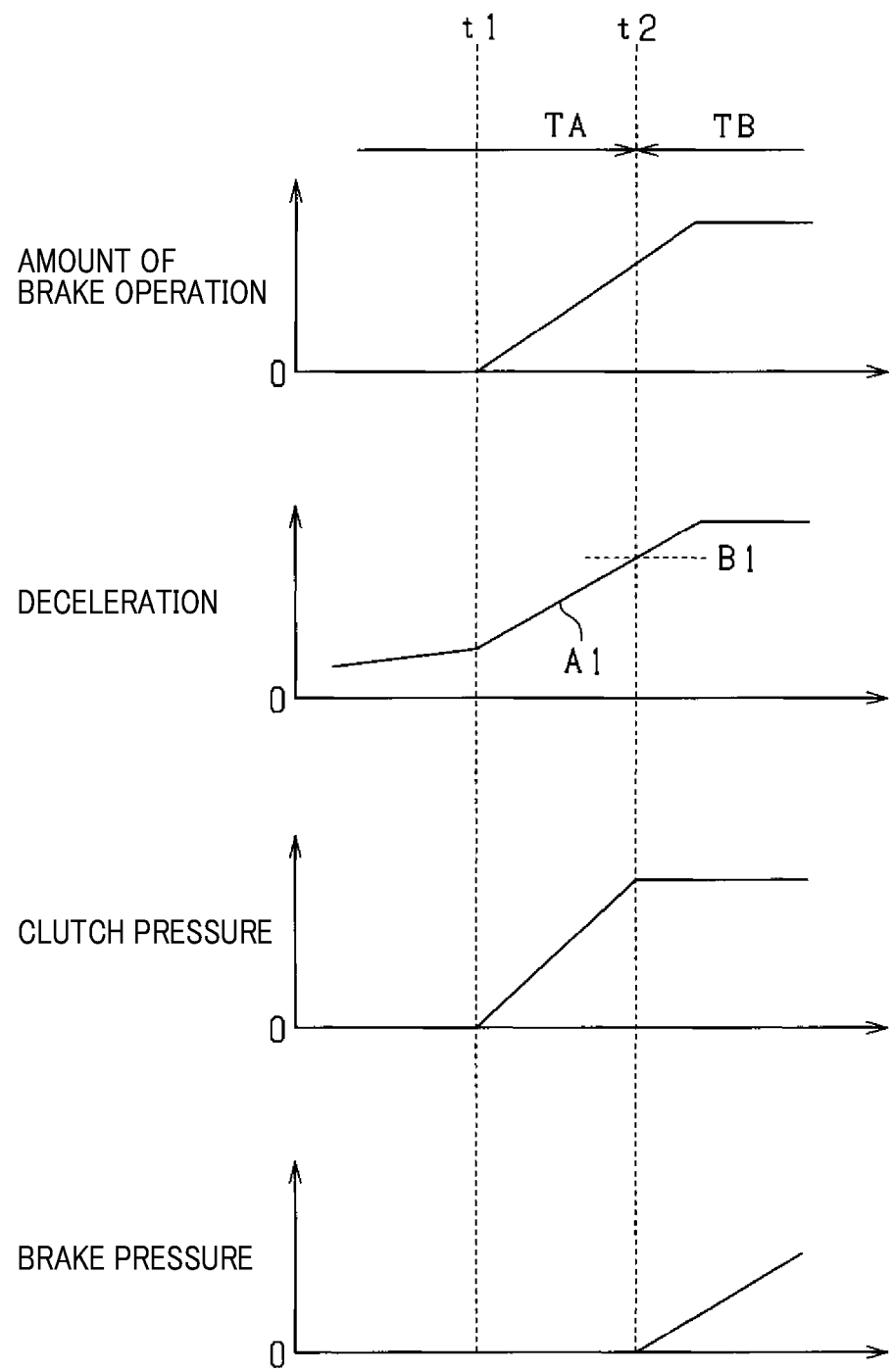
FIG. 11 is a time chart specifically illustrating coasting control.
Figure 12:
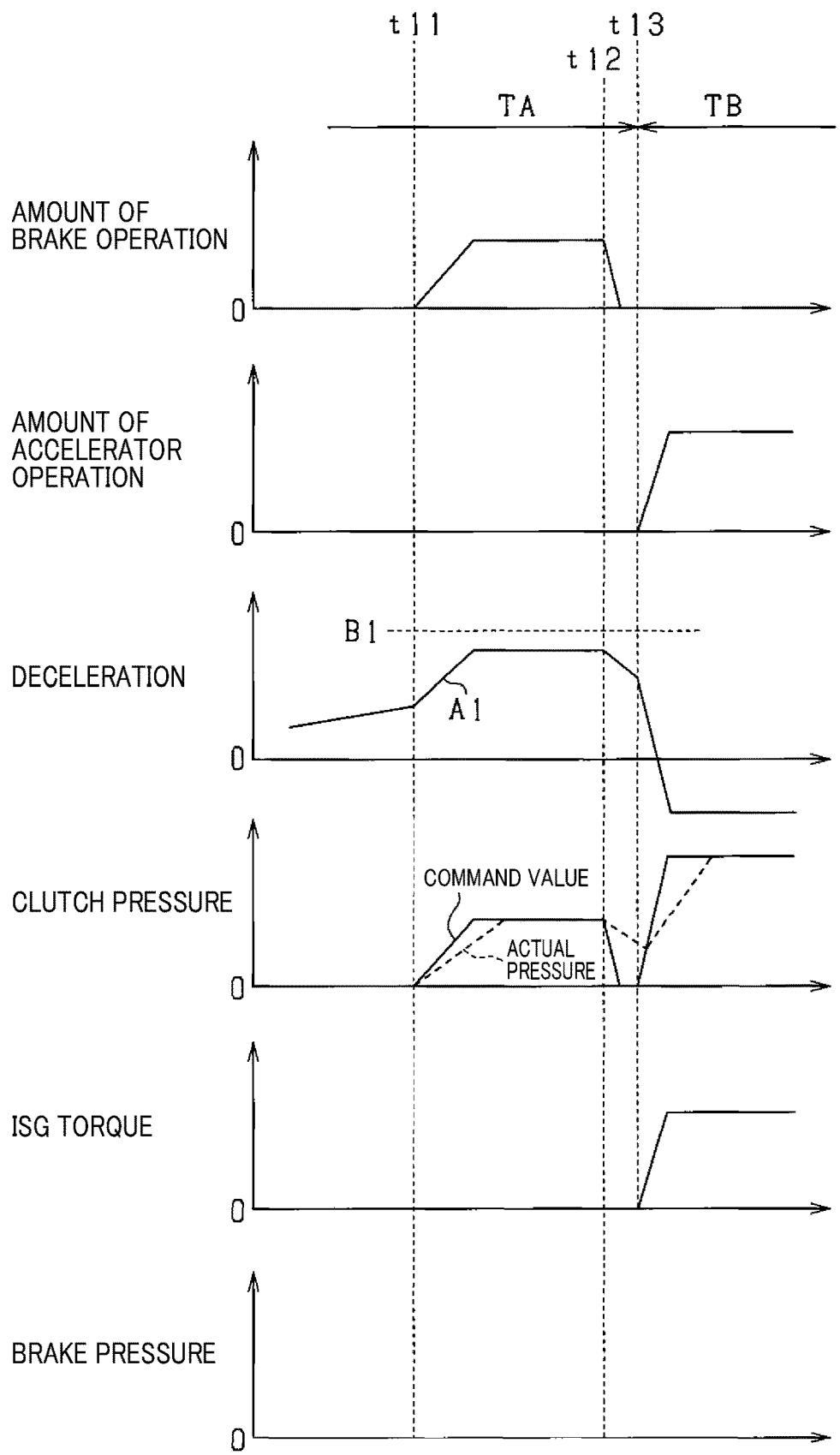
FIG. 12 is a time chart specifically illustrating coasting control.

Next, more specific description will be given to coasting control of the present embodiment by using time charts in FIGS. 11 and 12. FIGS. 11 and 12 each shows an example in which brake operation is performed by the driver in the vehicle 10 in coasting state and then coasting is cancelled. FIG. 11 shows an example in which coasting is cancelled when the requested deceleration A1 exceeds the threshold B1 due to an increase in the amount of brake operation. FIG. 12 shows an example in which coasting is cancelled when switching from brake operation to accelerator operation occurs and an acceleration request is made by the accelerator operation. In FIGS. 11 and 12, a time period TA is a coasting period, and a time period TB is a non-coasting period.

In FIG. 11, when brake operation is started by the driver at timing t1 in coasting period TA, a deceleration accordingly increases gradually as shown in FIG. 11. After timing t1, the half-clutch control is performed. At this point, the clutch pressure is set according to the amount of brake operation, so that the clutch device 16 is in the half-clutch state. In the half-clutch state, power is transmitted in the power transmission path by clutch engagement. Accordingly, engine braking occurs according to the degree of the engagement, and braking of the vehicle 10 is performed with the engine brake force. Thus, the brake pressure of the brake device 28 is limited in anticipation of the engine braking. In FIG. 11, during a time period between timings t1 and t2, although the brake operation is performed by the driver, the brake pressure is maintained at zero. However, the brake pressure does not need to be zero and only needs to be limited to a value smaller than that of the brake pressure corresponding to the amount of brake operation performed by the driver.

Thereafter, at timing t2, when the requested deceleration A1 reaches the threshold B1, coasting is cancelled. In this case, at timing t2, the degree of clutch engagement is 100% or close to 100% so that a sudden change in the deceleration at the transition to the non-coasting state is reduced or prevented from occurring. Then, after timing t2, the brake device 28 provides a braking force.

In FIG. 12, when brake operation is started by the driver at timing t11 in coasting period TA, a deceleration accordingly increases gradually as shown in FIG. 12. After timing t11, the half-clutch control is performed, so that the clutch device 16 is in the half-clutch state. In FIG. 12, a command value of the clutch pressure is indicated by a solid line, and an actual pressure is indicated by a dashed line. The actual pressure changes with a delay after a change of the command value. Similar to FIG. 11, the brake pressure is limited, and although the brake operation is performed by the driver, the brake pressure is maintained at zero.

In FIG. 12, however, unlike FIG. 11, the requested deceleration A1 does not reach the threshold B1, and in that state, after timing t12, switching from brake operation to accelerator operation occurs. For example, when a sudden course change, collision avoidance, or the like is performed, the switching from brake operation to accelerator operation thus occurs, and this presumably causes an acceleration request to the vehicle 10 to be made.

Specifically, at timing t12, the brake operation performed by the driver is cancelled, and accordingly, the command value for the clutch pressure changes to zero. At timing t13, which is immediately after the brake operation is cancelled, accelerator operation is started by the driver, and the accelerator operation causes a transition to the clutch-ON state, i.e., cancellation of coasting. In this case, in the clutch device 16, the actual pressure changes with a delay after the change of the command value for the clutch pressure, and the clutch pressure remains at timing t13. Thus, the transition to the clutch-ON state is quickly made. Furthermore, at timing t13, the ISG torque is set based on the engine rotational speed and the degree of acceleration request, and the ISG 13 is driven by power running based on the ISG torque.

Here, according to the existing technique, no half-clutch control is performed during coasting, and thus, even when a command to turn the clutch to ON is issued in the clutch- OFF state, a delay in a hydraulic pressure increase causes a delay in operating the clutch to ON, and this is likely to cause slow acceleration. On the other hand, the half-clutch control performed as described above reduces or prevents slow acceleration when acceleration of the vehicle 10 is started.

The present embodiment described above in detail yields the following good effects.

When coasting is started or cancelled, a braking force caused by the engine rotation (the so-called engine brake) is removed or added as the braking force of the vehicle 10. In this case, the deceleration of the vehicle 10 may suddenly change before and after a state transition when coasting is started or cancelled, and this may deteriorate drivability. In this regard, according to the present embodiment, the half-clutch control of the clutch device 16 is performed in coasting state at the beginning when coasting is started and immediately before coasting is cancelled. This reduces or prevents a sudden change in the vehicle deceleration caused by an increase or a decrease in the braking force caused by the engine rotation. In particular, when the clutch device 16 is set to be in the half-clutch state, the power transmission state is directly adjusted. This enables appropriate adjustment of the deceleration of the vehicle 10. Consequently, this eliminates discontinuity of the deceleration during the switching between coasting and non-coasting, and further achieves appropriate coasting control.

When an acceleration request is made by depressing the accelerator while the driver is performing a brake operation during coasting of the vehicle 10, a sudden course change, collision avoidance, or the like is assumed to be required. In this case, acceleration performance equivalent to or better than that of normal accelerator operation is presumably required. In this regard, according to the present embodiment, in coasting state, the half-clutch control is performed in which the engagement degree of the clutch device 16 is controlled based on brake operation information about brake operation performed by the driver. This enables a quick response to the switching from brake operation to accelerator operation, and thus an acceleration request is appropriately fulfilled. In short, slow acceleration in coasting state is eliminated.

Furthermore, when brake operation is being performed during coasting, as compared with when normal accelerator operation is performed, slow acceleration is more likely to occur due to a reduction in an inertial force caused by deceleration of the vehicle 10. However, the above configuration reduces or prevents slow acceleration due to the reduction in the inertial force.

When a transition from the brake ON state to the accelerator ON state is made while the vehicle is coasting, the degree of the acceleration request to the vehicle from the driver is presumably greater as the amount of brake operation immediately before the accelerator is turned ON is greater. This is because as the deceleration is greater, the greater amount of acceleration is required to switch to acceleration. In this regard, according to the present embodiment, the engagement degree of the clutch device 16 is increased as the amount of brake operation is greater. This achieves acceleration of the vehicle 10 as intended by the driver.

When the clutch device 16 is in the half clutch state during coasting, engine brake occurs, and this enables braking of the vehicle with the engine brake force. Thus, limiting the braking force of the brake device 28 in anticipation of the engine brake force enables appropriate braking deceleration of the vehicle.

When coasting is cancelled by operating the accelerator ON, as the engine 11 is at a lower speed, acceleration performance immediately after coasting is cancelled may more deteriorate. In this regard, according to the present embodiment, in a case where coasting is cancelled by operating the accelerator ON, an acceleration assist with the driving force of the ISG 13 is provided based on the engine rotational speed when the accelerator is ON. This achieves appropriate acceleration even at a low engine rotational speed.

Furthermore, when coasting is cancelled by operating the accelerator ON, an acceleration assist with the driving force of the ISG 13 is provided based on the degree of the acceleration request made when the accelerator is ON. This achieves appropriate acceleration as intended in the acceleration request from the driver.

When the clutch device 16 is at a high temperature, the clutch device 16 may be damaged by the half-clutch control. In this regard, according to the present embodiment, when the temperature of the clutch device 16 is determined to be within the high temperature range, the clutch device 16 is prohibited from being set to the half-clutch state in the half-clutch control. This achieves appropriate protection of the clutch device 16 while considering frictional heat generated by the half-clutch control.

According to the present embodiment, in the deceleration state during coasting (clutch-OFF), the requested deceleration A1 of the vehicle 10 is compared with the threshold B1, which is defined as the deceleration of the vehicle 10 while the accelerator is OFF and the clutch is ON, and when the requested deceleration A1 is greater than the threshold B1, coasting is cancelled. In this case, at the time of the transition to the clutch-ON state for releasing coasting, an actual deceleration appropriate to the clutch-ON state has been caused. Thus, deceleration behavior of the vehicle 10 corresponding to a deceleration request from the driver is obtained. Furthermore, when the requested deceleration A1 is smaller than the threshold B1, coasting is maintained. In this case, a frequent occurrence of coasting ON/OFF (switching) is reduced or prevented from occurring, and thus an increase in the effect of improving fuel economy and improvement in drivability can be expected. This achieves appropriate coasting control.

Furthermore, during coasting, coasting is cancelled on condition that the requested deceleration A1 of the vehicle 10 increases to reach the threshold B1 on the characteristic XB. Accordingly, when coasting is cancelled, a desired deceleration is obtained without the need for fuel injection. This enables a reduction in fuel consumption.

The degree of vehicle deceleration while the accelerator is OFF and the clutch is ON (non-coasting deceleration state) varies depending on the vehicle speed. By considering this, the threshold B1 calculated based on the vehicle speed can achieve more appropriate coasting control.

According to the present embodiment, when the vehicle 10 decelerates by brake operation during coasting, the requested deceleration A1 is calculated based on the amount of brake operation performed by the driver. This enables appropriate coasting control while directly reflecting a deceleration request from the driver.

According to the present embodiment, in the deceleration state during non-coasting (clutch-ON), the requested deceleration A2 of the vehicle 10 is compared with the threshold B2, which is defined as the deceleration of the vehicle 10 while the accelerator is OFF and the clutch is OFF, and when the requested deceleration A2 is greater than the threshold B2, coasting is started. In this case, at the time of the transition to the clutch-OFF state for coasting, an actual deceleration appropriate to the clutch-OFF state has been caused. Thus, deceleration behavior of the vehicle 10 corresponding to a deceleration request from the driver is obtained. Furthermore, when the requested deceleration A2 is smaller than the threshold B2, the non-coasting is maintained. In this case, a frequent occurrence of coasting ON/OFF (switching) is reduced or prevented, and thus an increase in the effect of improving fuel economy and improvement in drivability can be expected. This also achieves appropriate coasting control.

Furthermore, during non-coasting, coasting is started on condition that the requested deceleration A2 of the vehicle 10 increases to reach the threshold B2 on the characteristic XA. Accordingly, when coasting is started, a desired deceleration is obtained without the need for fuel injection. This also enables a reduction in fuel consumption.

The degree of vehicle deceleration while the accelerator is OFF and the clutch is OFF (coasting deceleration state) varies depending on the vehicle speed. By considering this, the threshold B2 calculated based on the vehicle speed can achieve more appropriate coasting control.

According to the present embodiment, when the vehicle 10 decelerates by a reduction in the amount of accelerator operation during non-coasting, the requested deceleration A2 is calculated based on the amount of accelerator operation performed by the driver. This enables appropriate coasting control while directly reflecting a deceleration request from the driver.

Furthermore, the characteristics XA and XB used for obtaining the thresholds B1 and B2 are determined according to the transmission gear ratio of the transmission 17. This achieves the desired coasting control by also considering the deceleration state which depends on the transmission gear ratio.

According to the present embodiment, the threshold B1 for the deceleration when coasting is cancelled is set to a value greater than the threshold B2 for the deceleration when coasting is started, i.e., a greater value of the degree of deceleration than the threshold B2. This enables appropriate coasting control when coasting is cancelled or started, while reflecting the clutch-OFF characteristic XA and the clutch-ON characteristic XB of the vehicle 10.

Hereinafter, a description will be given to embodiments different from the first embodiment, with particular emphasis on differences from the first embodiment.

Second Embodiment

According to the present embodiment, in a case where the half-clutch control has been performed immediately before coasting is cancelled and coasting is cancelled by operating the accelerator ON in coasting state, an acceleration assist with the driving force of the ISG 13 is provided based on a remaining engagement degree which remains in the clutch device 16 after the half-clutch control ends when the accelerator is ON.

Figure 13:
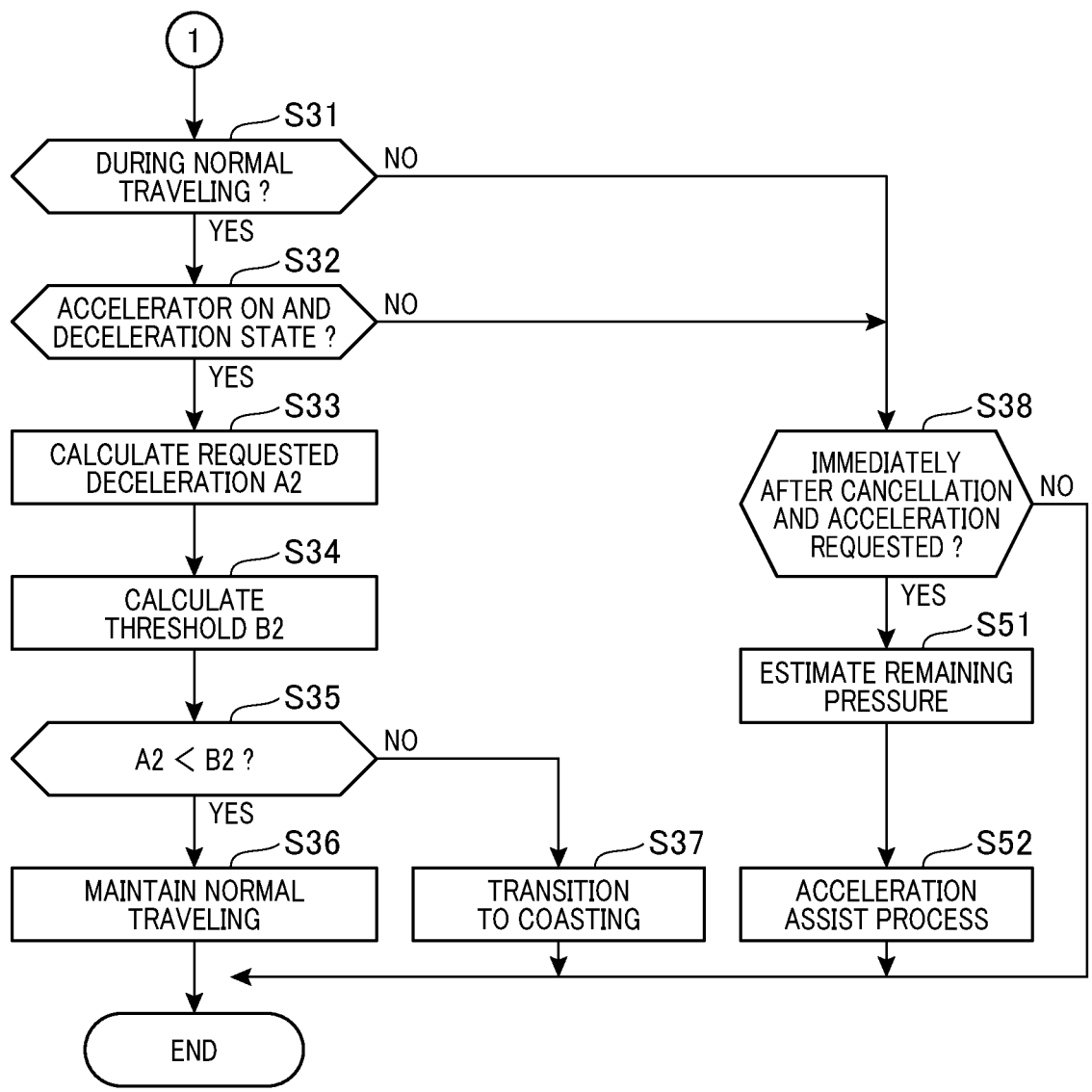
FIG. 13 is a flow chart showing a procedure for coasting control in a second embodiment.

FIG. 13 is a flow chart showing a procedure for coasting control, and the present process is a process partially modified from the process in FIG. 4 mentioned above. For convenience, in FIG. 13, the same steps as those in FIG. 4 are given the same step numbers.

In FIG. 13, when an affirmative determination (YES) is made at step S38, i.e., when, for example, conditions that the vehicle 10 is in the normal traveling state, coasting has been cancelled immediately beforehand, and an acceleration request has been made are all satisfied, the process proceeds to step S51. At step S51, in a case where the half-clutch control has been performed immediately before coasting is cancelled, a remaining clutch pressure which remains in the clutch device 16 after the half-clutch control ends when the accelerator is ON is estimated. In short, the actual pressure (pressure remaining in the clutch device 16) at timing t13 in FIG. 12 is estimated. The remaining clutch pressure corresponds to the "remaining engagement degree".

For example, the actual pressure of the clutch device 16 when the accelerator is ON presumably has a value corresponding the engagement degree in the half-clutch control or time elapsed after the half-clutch control ends (time between t12 and t13 in FIG. 12). Thus, the actual pressure of the clutch device 16 is estimated based on these parameters.

Figure 14:
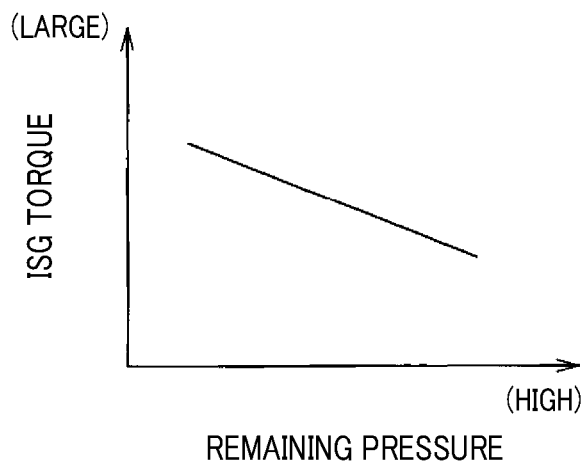
FIG. 14 shows a relationship between a remaining clutch pressure and an ISG torque.

Then, at step S52, an acceleration assist process is performed based on the remaining clutch pressure estimated at step S51. In the acceleration assist process, for example, an ISG torque is calculated by using a relationship shown in FIG. 14, and the ISG 13 is driven by power running based on the ISG torque. FIG. 14 shows a relationship in which the ISG torque is increased as the remaining clutch pressure is smaller. As the remaining engagement degree, any parameter may be used, provided that the parameter indicates the engagement degree which remains after the half-clutch control ends.

Alternatively, at step S52, at least one of the engine rotational speed and the degree of acceleration request when the accelerator is ON may also be used to calculate the amount of torque assist provided by the ISG 13 (ISG torque) and drive the ISG 13 by power running based on the ISG torque.

In short, the clutch pressure gradually decreases after the half clutch ends, and the degree of slow acceleration presumably varies depending on the remaining clutch pressure when the accelerator is ON. In this regard, according to the present embodiment, the acceleration assist is provided based on the remaining clutch pressure (remaining engagement degree). This achieves appropriate acceleration performance while reducing or preventing slow acceleration.

Third Embodiment

Figure 15:
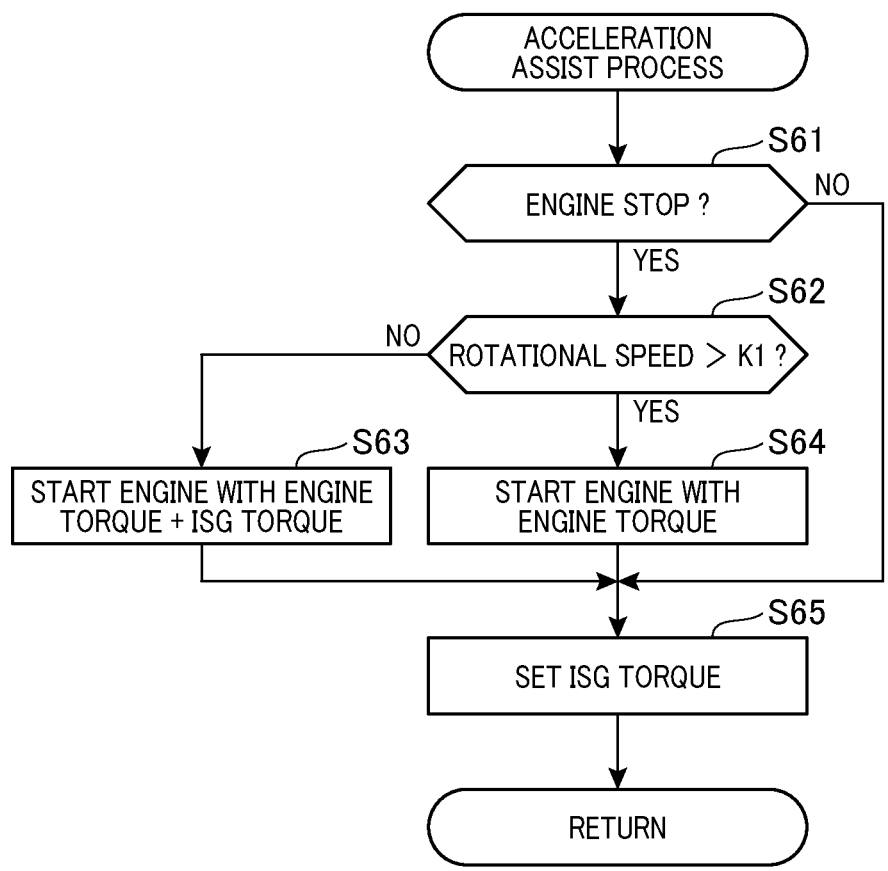
FIG. 15 is a flow chart showing an acceleration assist process in a third embodiment.

The acceleration assist process at step S39 in FIG. 4 may be implemented as shown in FIG. 15. Specifically, when coasting has been cancelled immediately beforehand and an acceleration request has been made, the acceleration assist process in FIG. 15 is performed.

In FIG. 15, at step S61, it is determined whether the engine 11 is in the stop state, i.e., a state in which combustion stops. When the engine 11 is in the stop state, the process proceeds to step S62, and the when the engine 11 is in the operating state, the process proceeds to step S65.

At step S62, it is determined whether the engine rotational speed when the accelerator is ON is higher than a predetermined value K1. The predetermined value K1 is a threshold for determining whether the engine 11 which is in the stop state during coasting is in a rotation state in which the engine 11 is restartable by combustion of fuel, and, for example, K1=300 rpm. When the engine rotational speed is lower than the predetermined value K1 and a negative determination is made at step S62, the process proceeds to step S63, and it is determined to restart the engine 11 by using the driving force of the ISG 13 and starting combustion in the engine 11.

When the engine rotational speed is higher than the predetermined value K1 and an affirmative determination is made at step S62, the process proceeds to step S64, and it is determined to restart the engine 11 by starting combustion in the engine 11 without using the driving force of the ISG 13.

Step S62 is to select whether to restart the engine 11 by using only the engine torque or restart the engine 11 by using both of the engine torque and the ISG torque. The restart of the engine may be selectively performed by considering not only the engine rotational speed but also the vehicle speed and the clutch pressure.

Then, at step S65, the ISG torque is set based on the degree of acceleration request made by the current accelerator ON. The setting of the ISG torque may be performed only when the engine rotational speed is high. Alternatively, the engine ECU 31 may be configured not to perform the process of setting the ISG torque in FIG. 13.

According to the present embodiment, the engine ECU 31 is configured such that when coasting is cancelled by operating the accelerator ON, the engine ECU 31 selects, based on the engine rotational speed when the accelerator is ON, whether to restart the engine 11 by using only the engine torque or restart the engine 11 by using both of the engine torque and the ISG torque. This achieves quick start and acceleration by using the ISG torque, even when the engine rotational speed is low and it is difficult to restart the engine 11 by using only combustion in the engine 11. When the engine rotational speed is sufficiently high so that acceleration can be performed by quickly outputting engine torque, energy consumption is reduced by not using ISG torque.

OTHER EMBODIMENTS

According to the above embodiments, the amount of brake operation (stepping amount of brake pedal) performed by the driver is acquired as the brake operation information. Alternatively, information about an ON/OFF state of brake operation may be acquired as the brake operation information. In this case, the half-clutch control is preferably performed by setting the degree of clutch engagement to a predetermined value, on condition that the brake is ON during coasting.

According to the above embodiments, the half-clutch control of the clutch device 16 is performed at the beginning when coasting is started and immediately before coasting is cancelled. Alternatively, the half-clutch control of the clutch device 16 may be performed at the beginning when coasting is started or immediately before coasting is cancelled.

According to the above embodiments, the requested deceleration A1 in coasting deceleration state is calculated based on the amount of brake operation, which is amount of depression of the brake pedal, but this may be altered. For example, instead of or in addition to the amount of brake operation, the requested deceleration A1 may be calculated based on a pressure generated by brake operation performed by the driver (a brake hydraulic pressure of the brake device 28) or a stepping speed of the brake pedal. In this case, the requested deceleration A1 only needs to be calculated based on a mode of the brake operation.

Furthermore, the requested deceleration A2 may be calculated based on a mode of the accelerator operation which is determined by using a parameter other than the amount of accelerator operation, which is the stepping amount of accelerator pedal. For example, the requested deceleration A2 is calculated based on time elapsed after the amount of accelerator operation starts to decrease.

During coasting, a hydraulic pressure may be applied to such an extent that the clutch-OFF state of the clutch device 16 is maintained, i.e., to such an extent that the space between the discs is reduced but no frictional force is generated. In this case, the engine ECU 31 performs hydraulic pressure control for reducing the space between the discs.

In short, the transition from the disengaged state to the engaged state of the clutch device 16 requires hydraulic pressure filling time for reducing the space between the discs, and the hydraulic pressure filling time causes a delay in engagement. In this regard, the hydraulic pressure control performed during coasting enables hydraulic pressure filling in advance, and this reduces or prevents a delay in engagement. This enables a quick transition to the power transmission state when deceleration or acceleration is requested during coasting, and thus continuity of the deceleration and accuracy in acceleration responsiveness are improved.

The present disclosure is described based on the embodiments; however, the present disclosure is considered not to be limited to the embodiments or the configurations. The present disclosure includes various modified examples and modifications within an equivalent range. In addition, a category or concepts of the present disclosure includes various combinations or forms and other combinations or forms including only one element, one or more elements, or one or less elements of those.

The invention claimed is:

1. A vehicle control apparatus which is applied to a vehicle including an engine as a traveling drive source and a clutch device provided in a power transmission path connected to an output shaft of the engine, the control apparatus causing the vehicle to be in a coasting state by reducing power transmitted in the power transmission path by operation of the clutch device upon satisfaction of a predetermined implementation condition, and cancels the coasting state by operation of the clutch device upon satisfaction of a predetermined coasting cancellation condition including at least an accelerator condition during coasting, the vehicle control apparatus comprising:
    a travel determination section which determines that the vehicle is in the coasting state; and
    a clutch control section which performs half-clutch control in the coasting state at a beginning of coasting and immediately before the coasting is cancelled, the half-clutch control setting an engagement degree of the clutch device to an intermediate degree state.

2. The vehicle control apparatus as set forth in claim 1, further including:
    an acquisition section which acquires brake operation information about brake operation performed by a driver, wherein
    the clutch control section controls the engagement degree of the clutch device based on the brake operation information acquired by the acquisition section in the coasting state.

3. The vehicle control apparatus as set forth in claim 2, wherein
    the acquisition section acquires an amount of brake operation as the brake operation information; and
    the clutch control section increases the engagement degree of the clutch device as the amount of brake operation is greater in the coasting state.

4. The vehicle control apparatus as set forth in claim 1, further including:
    a brake control section which limits a braking force of a brake device when the half-clutch control has been performed by the clutch control section, the braking force being provided according to an amount of brake operation performed by the driver.

5. The vehicle control apparatus as set forth in claim 1, which is applied to the vehicle including an electric motor which generates a driving force used to accelerate the vehicle, the vehicle control apparatus further including:

an acceleration control section which provides an acceleration assist with the driving force of the electric motor based on an engine rotational speed when an accelerator is ON in a case where the coasting is cancelled by turning the accelerator ON in the coasting state.

6. The vehicle control apparatus as set forth in claim 1, which is applied to the vehicle in which the engine is stopped in the coasting state and which includes an electric motor which generates a driving force used to accelerate the vehicle, the vehicle control apparatus further including:

a rotation determination section; and a start control section, wherein the rotation determination section determines whether an engine rotational speed when an accelerator is ON is higher than a predetermined value at which the engine is restartable by combustion of fuel in a case where the coasting is cancelled by turning the accelerator ON in the coasting state, and the start control section restarts the engine by starting combustion in the engine without using the driving force of the electric motor in a case where the engine rotational speed when the accelerator is ON is determined to be higher than the predetermined value, and the start control section restarts the engine by using the driving force of the electric motor and starting combustion in the engine in a case where the engine rotational speed when the accelerator is ON is determined to be lower than the predetermined value.

7. The vehicle control apparatus as set forth in claim 1, which is applied to the vehicle including an electric motor which generates a driving force used to accelerate the vehicle, the vehicle control apparatus further comprising:

an acceleration control section which provides an acceleration assist with the driving force of the electric motor based on a degree of acceleration request made when an accelerator is ON in a case where the coasting is cancelled by turning the accelerator ON in the coasting state.

8. The vehicle control apparatus as set forth in claim 1 further including:

a temperature determination section which determines whether a temperature of the clutch device is within a predetermined temperature range, wherein the clutch control section prohibits the clutch device from being set to the intermediate degree state in the half-clutch control when the temperature of the clutch device is determined to be within the temperature range.

9. A vehicle control apparatus which is applied to a vehicle including an engine as a traveling drive source and a clutch device provided in a power transmission path connected to an output shaft of the engine, the control apparatus causing the vehicle to be in a coasting state by reducing power transmitted in the power transmission path by operation of the clutch device upon satisfaction of a predetermined implementation condition, and cancels the coasting state by operation of the clutch device upon satisfaction of a predetermined coasting cancellation condition including at least an accelerator condition during coasting, the vehicle control apparatus comprising:

a travel determination section which determines that the vehicle is in the coasting state; and a clutch control section which performs half-clutch control in the coasting state at a beginning of the coasting, the half-clutch control setting an engagement degree of the clutch device to an intermediate degree state.

10. The vehicle control apparatus as set forth in claim 9, further including:

an acquisition section which acquires brake operation information about brake operation performed by a driver, wherein the clutch control section controls the engagement degree of the clutch device based on the brake operation information acquired by the acquisition section in the coasting state.

11. The vehicle control apparatus as set forth in claim 10, wherein the acquisition section acquires an amount of brake operation as the brake operation information; and the clutch control section increases the engagement degree of the clutch device as the amount of brake operation is greater in the coasting state.

12. The vehicle control apparatus as set forth in claim 9, further including:

a brake control section which limits a braking force of a brake device when the half-clutch control has been performed by the clutch control section, the braking force being provided according to an amount of brake operation performed by the driver.

13. The vehicle control apparatus as set forth in claim 9, which is applied to the vehicle including an electric motor which generates a driving force used to accelerate the vehicle, the vehicle control apparatus further including:

an acceleration control section which provides an acceleration assist with the driving force of the electric motor based on an engine rotational speed when an accelerator is ON in a case where the coasting is cancelled by turning the accelerator ON in the coasting state.

14. The vehicle control apparatus as set forth in claim 9, which is applied to the vehicle in which the engine is stopped in the coasting state and which includes an electric motor which generates a driving force used to accelerate the vehicle, the vehicle control apparatus further including:

a rotation determination section; and a start control section, wherein the rotation determination section determines whether an engine rotational speed when an accelerator is ON is higher than a predetermined value at which the engine is restartable by combustion of fuel in a case where the coasting is cancelled by turning the accelerator ON in the coasting state, and the start control section restarts the engine by starting combustion in the engine without using the driving force of the electric motor in a case where the engine rotational speed when the accelerator is ON is determined to be higher than the predetermined value, and the start control section restarts the engine by using the driving force of the electric motor and starting combustion in the engine in a case where the engine rotational speed when the accelerator is ON is determined to be lower than the predetermined value.

15. The vehicle control apparatus as set forth in claim 9, which is applied to the vehicle including an electric motor which generates a driving force used to accelerate the vehicle, the vehicle control apparatus further comprising:

an acceleration control section which provides an acceleration assist with the driving force of the electric motor based on a degree of acceleration request made when an accelerator is ON in a case where the coasting is cancelled by turning the accelerator ON in the coasting state.

16. The vehicle control apparatus as set forth in claim 9 further including:
a temperature determination section which determines whether a temperature of the clutch device is within a predetermined temperature range, wherein
the clutch control section prohibits the clutch device from being set to the intermediate degree state in the half-clutch control when the temperature of the clutch device is determined to be within the temperature range.

17. A vehicle control apparatus which is applied to a vehicle including an engine as a traveling drive source, a clutch device provided in a power transmission path connected to an output shaft of the engine, and an electric motor which generates a driving force used to accelerate the vehicle, the control apparatus causing the vehicle to be in a coasting state by reducing power transmitted in the power transmission path by operation of the clutch device upon satisfaction of a predetermined implementation condition, and cancels the coasting state by operation of the clutch device upon satisfaction of a predetermined coasting cancellation condition including at least an accelerator condition during coasting, the vehicle control apparatus comprising:
a travel determination section which determines that the vehicle is in the coasting state;
a clutch control section which performs half-clutch control in the coasting state at immediately before the coasting is cancelled, the half-clutch control setting an engagement degree of the clutch device to an intermediate degree state; and
an acceleration control section which provides an acceleration assist with the driving force of the electric motor based on a remaining engagement degree which remains in the clutch device after the half-clutch control ends when an accelerator is ON in a case where the half-clutch control has been performed immediately before the coasting is cancelled and the coasting is cancelled by turning the accelerator ON in the coasting state.

18. The vehicle control apparatus as set forth in claim 17, further including:
an acquisition section which acquires brake operation information about brake operation performed by a driver, wherein
the clutch control section controls the engagement degree of the clutch device based on the brake operation information acquired by the acquisition section in the coasting state.

19. The vehicle control apparatus as set forth in claim 18, wherein
the acquisition section acquires an amount of brake operation as the brake operation information; and
the clutch control section increases the engagement degree of the clutch device as the amount of brake operation is greater in the coasting state.

20. The vehicle control apparatus as set forth in claim 17, further including:
a brake control section which limits a braking force of a brake device when the half-clutch control has been performed by the clutch control section, the braking force being provided according to an amount of brake operation performed by the driver.

* * * * *